United States Patent
Brink

Patent Number: 5,417,996
Date of Patent: May 23, 1995

[54] METHOD AND APPARATUS FOR FOLDING WING PORTIONS OF FLAT DOUGH MEMBERS

[75] Inventor: Poul E. Brink, Randers, Denmark

[73] Assignee: Form & Frys Maskinteknik ApS, Hobro, Denmark

[21] Appl. No.: 170,238

[22] PCT Filed: Jun. 29, 1992

[86] PCT No.: PCT/DK92/00204
§ 371 Date: Dec. 27, 1993
§ 102(e) Date: Dec. 27, 1993

[87] PCT Pub. No.: WO93/00013
PCT Pub. Date: Jan. 7, 1993

[30] Foreign Application Priority Data

Jun. 27, 1991 [DK] Denmark .................. 1264/91

[51] Int. Cl.$^6$ .................. A21C 11/00; A23P 1/00
[52] U.S. Cl. .................. 426/502; 425/343; 425/394; 425/409; 426/512
[58] Field of Search .................. 426/496, 502, 512; 425/343, 394, 409

[56] References Cited

U.S. PATENT DOCUMENTS

| | | | |
|---|---|---|---|
| 2,458,338 | 1/1949 | Buechek | 425/343 |
| 3,653,337 | 4/1972 | Hanson | 425/394 |

*Primary Examiner*—George Yeung
*Attorney, Agent, or Firm*—Antonelli, Terry, Stout & Kraus

[57] ABSTRACT

In the production of various kinds of pastry it is actual to effect a folding-over of wing portions of flat dough members, such that these portions are folded down over some stuffing deposited e.g. on a middle area of the dough member. While this is easily done manually, it has been very difficult to automatize the operation, but according to the invention this is achieved in a very simple and efficient manner. A rubber resilient shaping plate (8) is used, which, through foldable areas (12), is connected with projecting wing portions (10) each associated with a depending rubber rod (16). At their lower ends these rods are rigidly attached to an actuator plate (18), which, in being raised relative to the shaping plate (8), urges the rubber rods upwardly for folding the wing portions (19) up- and inwardly. Hereby the rubber rods will be bent, and due to the tensions thus produced a further raising of the actuator plate can result in the rods (16) causing the wing portions (19) to be folded inwardly over and down towards the shaping plate.

2 Claims, 5 Drawing Sheets

METHOD AND APPARATUS FOR FOLDING WING PORTIONS OF FLAT DOUGH MEMBERS

BACKGROUND OF THE INVENTION

The present invention relates to a method and an apparatus for shaping flat dough members by an inward folding of outer portions thereof. Various bakery products, e g Danish 'spandauers' are produced in just this manner, a stuffing being placed on a middle area of a dough plate, the opposed edge areas of which, seen in the respective main directions, are thereafter folded inwardly over the stuffing. The operation should preferably be terminated by a firm, local pressure against the inner corner areas of the dough plate as now folded inwardly.

Although the associated movements are relatively simple and can easily be accomplished by trained bakers, it has been found that the same movements are rather difficult to provoke mechanically. Usable machines have been provided, but they are complicated and expensive, and they are difficult to keep clean.

SUMMARY OF THE INVENTION

Mechanically it will be simple enough to effect a pure folding of a soft base plate, but in the present connection the foldings should not be sharp, but rather soft, having the character of a soft folding up and a subsequent soft folding in, such that the entire folding-over becomes voluminous.

The invention is based on a new type of movement control which is well suited, by simple means, to effect the foldings as here discussed, such that it is possible to provide relatively cheap and fast working machines for the relevant production.

The invention relies on a consistent utilization of rubber resilient means for providing the folding, viz. for one part a dough carrier plate having a base portion and a number of folding wings projecting therefrom and connected with the base portion through bendable, rubber resilient connector portions, and for another part—for each folding wing—a rubber resilient rod, which, from an outer end area of the folding wing, extends substantially vertically downwardly to a lower holding element for all the rubber rods, this element being upwardly displaceable relative to the said base portion, and each rubber rod at its opposite ends being in rigid connection the holding element and the underside of the folding wing, respectively. When the holding element and therewith the rubber rods are displaced upwardly relative to the base portion each of the folding wings will be forced to fold upwardly during bending of the said connector portions. These portions are willingly bendable without being noticeably stretchable, i.e. they will act as a 'soft hinge', which by the folding up of the associated folding wing, will cause the outer end of the folding wing to be forced horizontally inwardly towards the base portion, concurrently with the lifting movement.

Inasfar as the upper end of the rubber rod is rigidly connected with the under- or outer side of the folding wing the folding up of this wing will cause an inwardly directed bending of the upper end portion of the rubber rod, not only because the holding area is displaced also inwardly, but also because the end of the rubber rod via its rigid connection will seek to remain perpendicularly projecting from the plane of the folding wing. Thereby an extra bending effect will imposed on the rubber rod, because the folding wing, at the relevant joining area, will have changed not only its horizontal location, but also its angular position.

During the further course of the upward displacement of the rubber rods there will occur movements and conditions which are rather difficult to explain, whereby the rubber rods will well generally seek to push or pull the folding wings upwardly, though at the same time influencing these portions to a further upwardly and inwardly directed pivoting and even to a final downwardly directed pivoting, by the final phase of which it is possible to exert a marked downwardly directed pressure on the outer end of the folded wing portion, while at the same time the wing portion is affected to be resiliently lifted from the base plate; by the latter action the said bendable connector portion is held stretched vertically, such that it may form the desired smooth or breakfree bending.

In this manner it is possible to effect an upwardly, inwardly and downwardly directed folding of the folding wings solely by an upward displacement of the holding element, to which the lower ends of the rubber rods are secured, and the movement may even be terminated by the final upward displacement of the rubber rods giving rise to a downwardly directed final pressure on the outer ends of the folding wings. When also these wings consist of a rubber resilient material this pressure will reveal itself as a local pressure on the dough member as now being folded, and as mentioned above this is a highly desirable effect.

Thus, in connection with the invention it is sufficient to use two mutually movable parts, viz. the base plate portion and the holding element for the rubber rods, while all the other parts can be rigidly mutually connected, though in a resiliently bendable manner. All this will condition a very 'clean' design of the apparatus, which will comprise only quite few and easily accessible parts, e.g. without conventional hinge portions in which dough particles can be deposited, and the apparatus, therefore, will be very easy to clean, in addition to being extremely simple in construction.

BRIEF DESCRIPTION OF THE DRAWINGS

In the following the invention is described in more detail with reference to the drawing, in which.

DETAILED DESCRIPTION OF THE PREFERRED EMBODIMENTS

Figure 1:
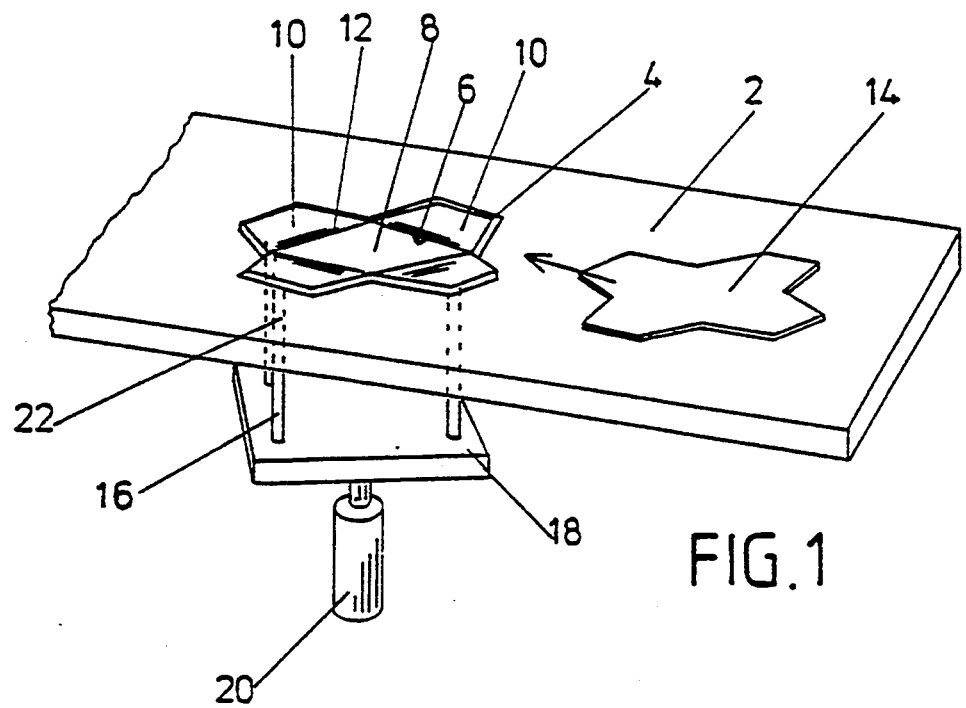
FIG. 1 is a schematic perspective view of an essential part of an apparatus according to the invention.

The apparatus shown in FIG. 1 comprises a table plate 2, in which there is a depression 4 for receiving a flat shaping tool 6 consisting of a middle plate portion 8 and wing plates 10 projecting therefrom, these wing plates being adapted to be folded over the middle or base plate portion 8 about folding areas 12 between the base plate and the single wings. The base plate 6 is secured to the table plate 2 in level therewith, such that initially a correspondingly shaped workpiece such as a stamped dough piece 14 may be placed on the tool 6 by a simple displacement along the table plate.

The base plate 8 and the wings 10 are made in one piece from a rubber resilient, bendable material, whereby the folding or hinge areas 12 form integral transitions between the respective parts 8 and 10.

Near the outer ends of the wings 10 there is secured to the lower side thereof the upper end of a depending rod 16 likewise consisting of rubber. The lower ends of these rods are rigidly secured to a horizontal actuator plate 18 which can be moved up and down by means of a suitable driving system such as a cylinder 20. The rubber rods 16 project through the table plate 2, through slots 22 extending radially relative to the middle of the base plate 8.

Figure 2:
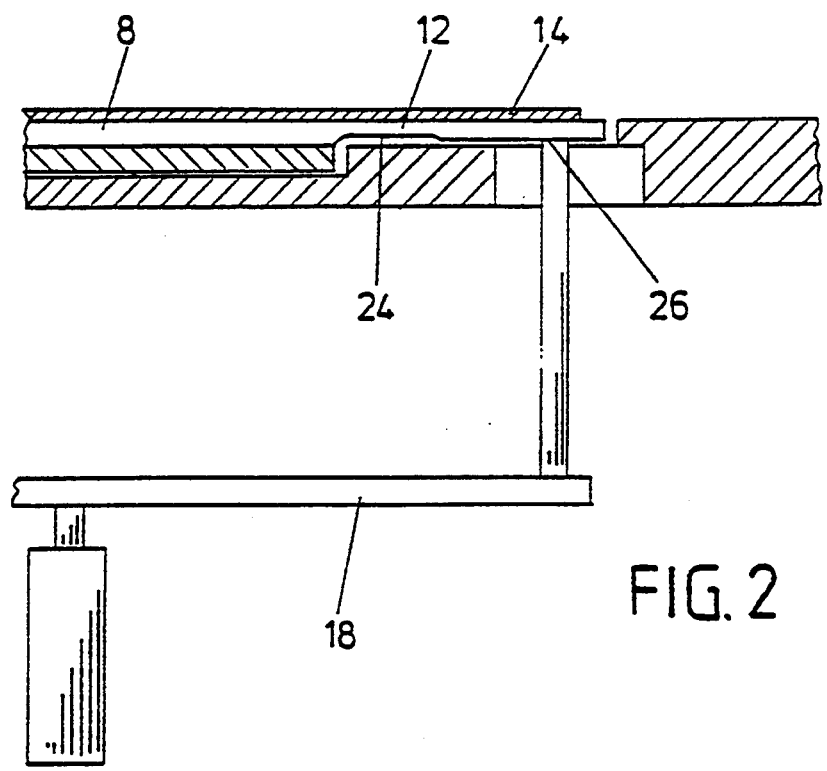
FIG. 2 is a lateral sectional view thereof.

In FIG. 2 it is also shown that the folding area 12 may be defined by a lower recess 24 in the wing material, but this will not be absolutely necessary, all according to the characteristics of the material. A recess, if any, may be replaced by a number of parallel grooves.

Figure 3:
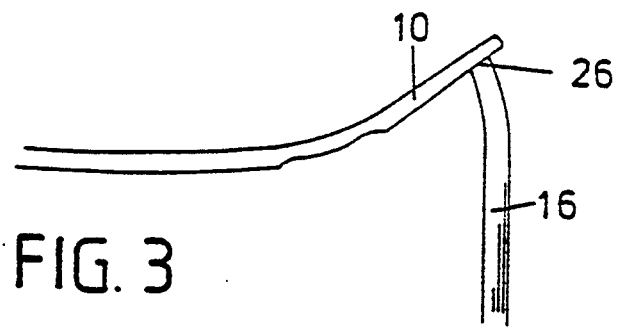
FIGS. 3-8 are corresponding sectional views illustrating the upward and inward folding of a folding wing of the apparatus.

When the dough member 14 has been placed the cylinder 20 is actuated to force upwardly the actuator plate 18 and therewith the rubber rods 16. An immediate effect will be an upward pivoting of the folding tool wings 10, as their outer ends are forced upwardly by the rods 16, but as the wings will at the same time be swung about the areas 12 the fixation areas designated 26 of the upper rod ends will be forced to move inwardly, whereby the upper ends of the rods 16 will be bent a little as illustrated in FIG. 3. The same displacement would take place if the upper rod ends were hinged to the wings 10, but it is important that there are no hinge connections, but rather rigid connections with the undersides of the wings.

The rubber rods 16, then, will react by being resiliently bent.

Figure 4:
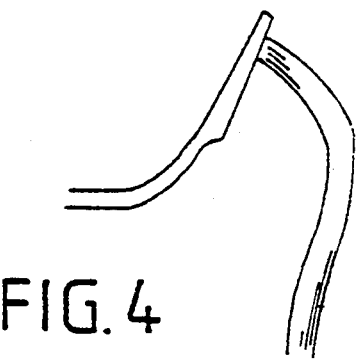
Figure 5:
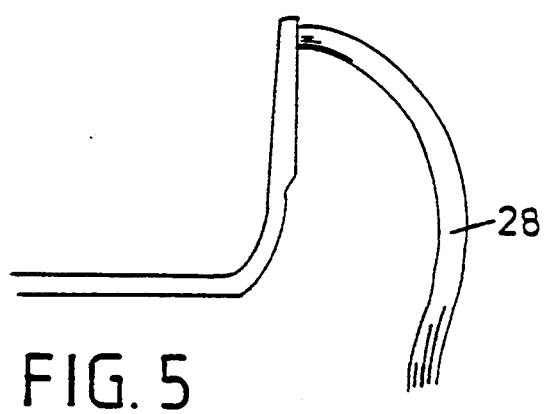
Figure 6:
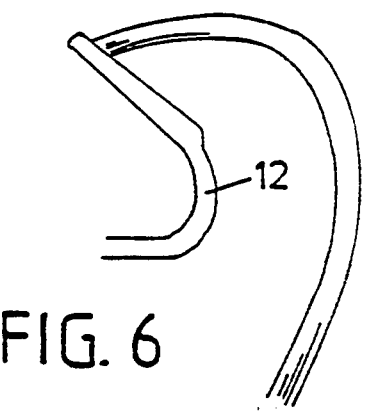

By a further upward displacement of the plate 18 and therewith the rubber rod 16 as shown in FIGS. 3–7 this bending of the rod will be increasingly pronounced. As shown in FIGS. 4 and 5 the wing 10 will be pivoted towards a vertical position, inasfar as the rod 16, due to its resiliency, can still transfer an upwardly and inwardly directed force to the wing, i.e. force the wing to carry out this inwardly directed movement.

When the lower end of the rod 16 is moved further upwardly from the position shown in FIG. 5 the upper rod end cannot move further upwardly, and the result will be an increased bending of the rod, whereby the upper bent rod portion designated 28 is bound to be bent outwardly. This, however, gives rise to the upper rod end transferring an increased inwardly directed pressure on the wing 10, which will thus, see FIG. 6, be folded further inwardly and now even downwardly. The rubber rod seeks to straighten out itself, this having the important consequence that it will affect the wing 10 as a whole with an upwardly directed pull, whereby the folding area 12 is kept drawn upwardly, such that the folding will not get the character of a sharp bending. In this manner plenty of space can be left for the dough member 14 to be folded through a desired soft curve, i.e. with the possibility of being folded over an amount of stuffing (not shown) placed on the dough member, without the stuffing being pressed inwardly by the folding of the wing 10.

Figure 7:
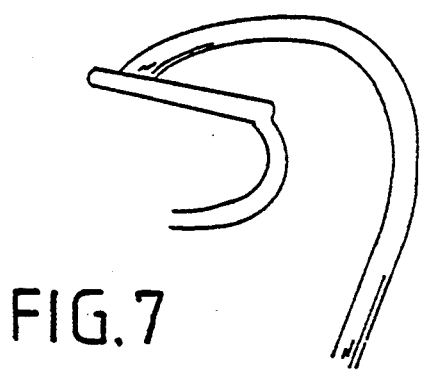

When the rubber rod 16 is pushed further upwardly the bending of the portion 28 will proceed still further, see FIG. 7, and consequently the upper end of the rubber rod will bias towards the left and thereby force the wing 10 to be folded further inwardly and thus also downwardly, even though the rubber rod is pushed upwardly.

Through the bending 28 there will be transferred to the wing 10 a downward pushing force that will be exerted even after the wing having passed a folded-in horizontal position, i.e. the wing 10 and therewith the corresponding part of the dough member 14 may be pressed down centrally over the middle of the dough member with a firm pressure, despite the fact that the pressure exerting rubber rod will at the same time seek to draw the entire wing portion 10 upwardly, such that there will be no sharp folding if the folding area 12. It may seem a paradox that an upward displacement of the rubber rods can provoke a downpressing of the folded in wing portions 10, but practical tests have proved this to be possible. What is achievable is not only a folding inwardly and downwardly of the wing 10 as a whole, but also a local pressing down of the part of the resilient wing material located adjacent to the connecting area 26 of the upper end of the rubber rod 16. Thus, in spite of the upwardly directed actuation of the rods 16 it is possible to achieve a desirable local pressing down of the upper and inner part of the folded in wing portions of the dough member.

Herewith the desired result has been obtained.

Figure 8:
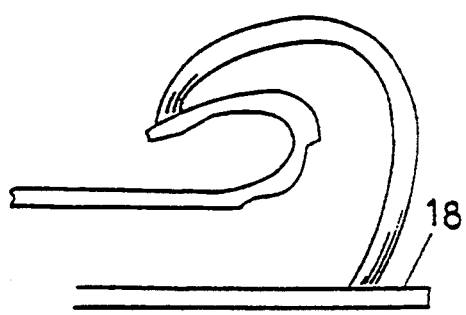
Figure 9:
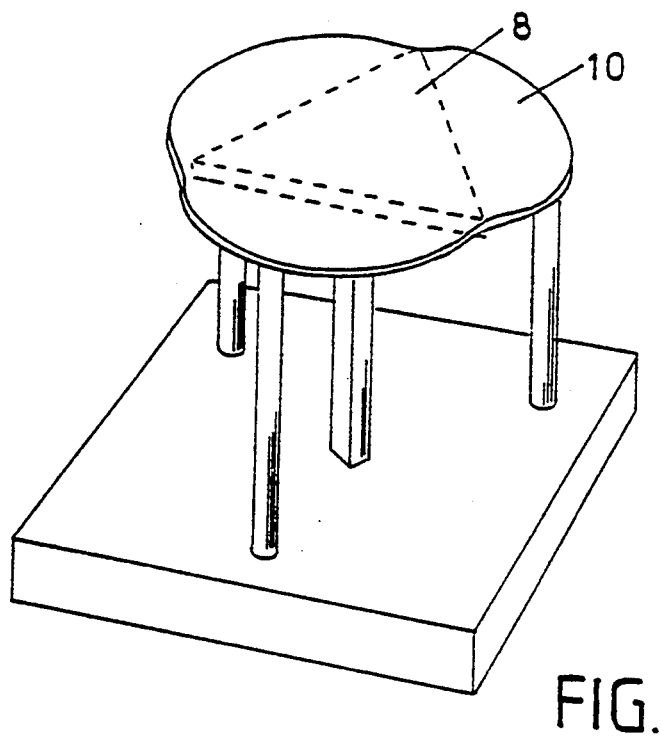
FIGS. 9-13 are perspective views illustrating the same in connection with the use of three wings.
Figure 10:
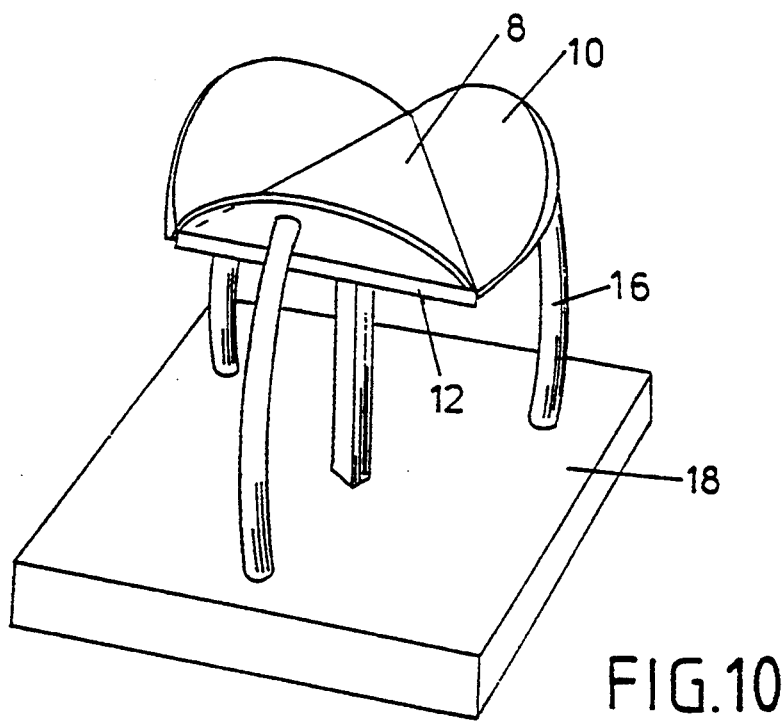
Figure 11:
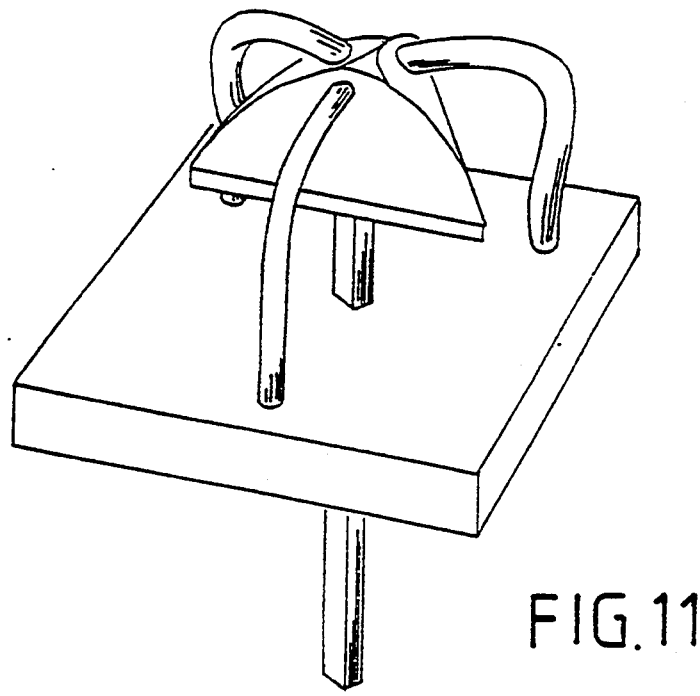

The wings 10, of course, can be brought back the their original flat position by actuation of the cylinder 20 to retract the plate 18, whereby the parts will return to their initial positions in accordance with the movement pattern shown in FIGS. 8–2. The shaped article will be left standing on the base plate 8, and it may be pushed away onto the table plate 2 or be removed otherwise.

FIGS. 9–13 illustrate, in perspective views, the folding sequence of a tool with three wings for shaping pastries known as 'Napoleon hats'. The functions will not be described in detail, as they will correspond fully to the operation already described.

Apart from the very simple, almost monolithic design of the entire tool, the tool distinguishes itself in that the detailed course of the folding may be adapted widely to different requirements solely by the dimensioning, the positioning and the sequence of actuation of the rubber rods, and/or the shape and the length of the folding area 12. By way of example, for the products ('spandauers') to be produced according to FIG. 1 it is desirable that a first folding is effected by two opposed wings, whereafter the two other wing portions of the dough member are folded over the already folded portions for partial coverage thereof. This, however will only be a question of controlling the raising of the respective two pairs of rubber rods in a selective manner. Besides, the wings 10 may be mutually very different, all according to the actual demands.

Also the hardness and the initial direction of the rubber rods may have a decisive influence on the folding characteristic, as may the hardness and the flexibility of the wings 10, partly in the transition area 12 and partly in the outer wing material. Thus, the tool may be designed for almost any thinkable, relevant task.

As a further example the folding of the pancake about spring rolls and similar products can be mentioned. It will be appreciated that with a suitably designed apparatus of the discussed type it will be possible to effect a widely overlapping folding in of opposed pancake portions, optionally subsequent to a 'short' folding in of its portions next to the ends of the stuffing string in the roll.

The apparatus may operate with a rather high speed both in the forming stroke or strokes and in the return strokes.

It will be appreciated that the apparatus will be extraordinary easy to keep clean, e.g. by flushing with the wings 10 assuming more or less upwardly inclined positions, optionally even folded fully inwardly, as there are no rotation hinges or other guidings that could collect dirt or be difficult to flush clean, or even give rise to substantial operational interruptions.

In the drawing so far described there is only shown the folding tool in connection with the table 2, but it will be understood that the tool is very well suited to be included at a large number in a shaping machine, with associated means for rapid feeding of the dough members to the tools and removal of the shaped articles therefrom. It is deemed unnecessary to describe this in more detail at this place.

The invention provides for a new type of motion control, whereby opposed wing portions can be folded towards each other, and the invention will comprise the application of this technique where it might prove usable for purposes other than that already described. Thus, it will be noted that by the transition from FIG. 5 to FIG. 6 the tool will be able to effect a clamping action against an object placed between the opposed wings 10 as inwardly pivotal from FIG. 5, or even between a fixed support and only one such pivotal wing, whereby the apparatus will be usable as a means for gripping and temporarily holding various objects. This may be particularly important if the tool is used in an inverted position, in which it can be lowered over the object and grip the same for a subsequent lifting and conveying of the object. The pivoting force on the wings can be controlled in a simple manner by sensing the required displacement pressure on the rubber rods 16; because of the resiliency of the elements it is possible to operate with a gentle, yet sufficient holding pressure, which may make the invention particularly applicable for the gripping of sensible objects.

Figure 12:
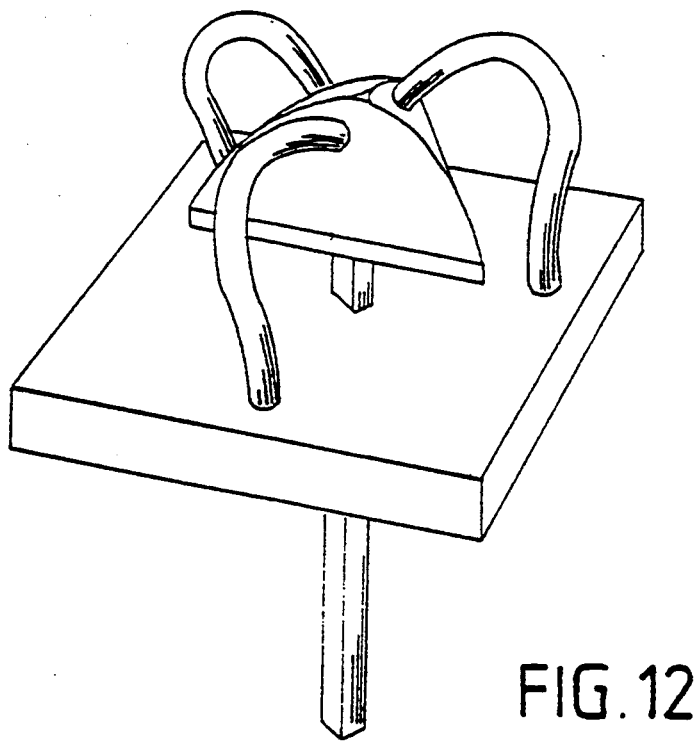
Figure 13:
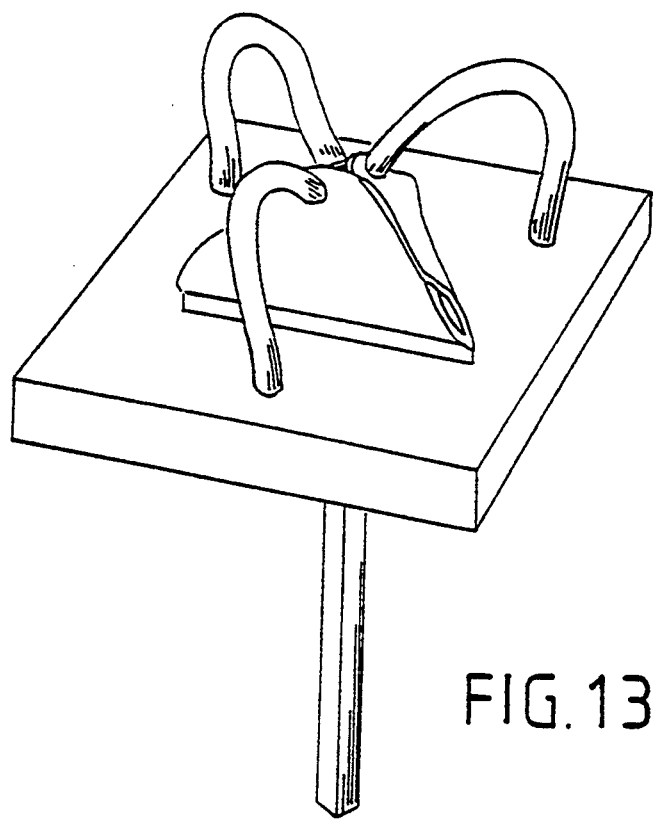

Likewise, the tool would be applicable for the shaping of mouldable substances, e.g. into a shape as achievable according to FIGS. 12 or 13.

Figure 14:
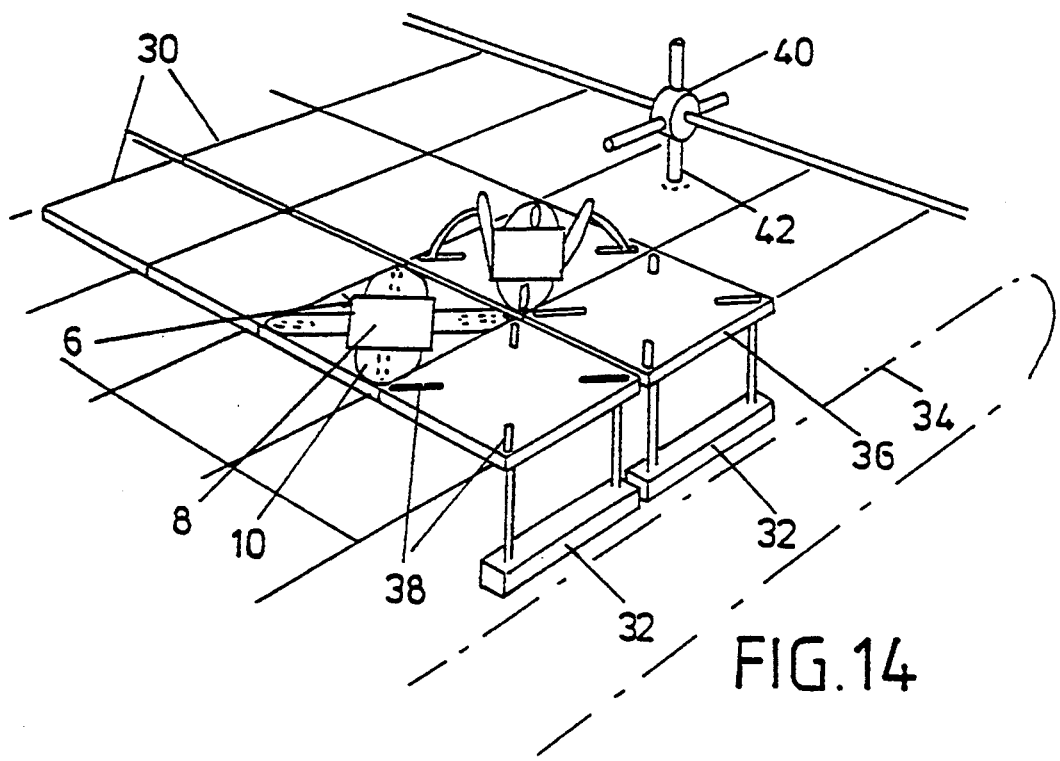
FIG. 14 is a schematic view of a production line.

FIG. 14 illustrates a couple of elements 30 in a forming apparatus according to the invention. These elements are mounted on foot pieces 32 secured to chain links on endless driving chains 34, and the elements comprise a base plate 36 that is elongated in the transverse direction, with a width corresponding to a single forming area and a length corresponding to a plurality of such areas; these are here shown to be quadratic. On each of the forming areas there is provided a forming tool 6 in accordance with FIG. 1, and at the corners the plates are provided with diagonally extending slots 38, through which the rubber rods 16 depending from the wing portions 10 extend. These rods project down to non-illustrated foot members, which cooperate with longitudinally arranged control cam means for inducing the relevant up- and downwardly directed movements as a function of the very conveying of the elements. In FIG. 14 it is indicated that initially only two opposed wings 10 are folded up. Seen in the conveying direction, the rubber rods of these wings are positioned flush with the rods of the wings to be actuated subsequently, i.e. it is required to operate with two sets of control cams that operate selectively, e.g. in cooperating with foot members projecting to mutually opposite sides for the two sets of rubber rods.

The elements 30 will be easy to keep clean, and they will also be easy to change out individually, should the need arise.

40 designates an overhead, rotating body having radially projecting pressure fingers 42, which may successively be pressed down against the central areas of the ready shaped objects, when such an extra firm pressure is desired.

I claim:

1. A method of producing an up- and inwardly directed folding of wing portions of a dough plate member, comprising: placing the dough member on a carrier plate having outwardly projecting, up- and inwardly foldable wings connected thereto through an area consisting of elastomeric material, and actuation means for effecting such a folding with a resulting folding of the wing portions of the dough member; and upwardly displacing rubber resilient rods, which at their upper ends are rigidly connected with a lower side of the wings adjacent an outer area thereof and extend downwardly therefrom to a lower end area in fixed connection with at least one vertically displaceable actuation element, the length and character of the rubber resilient rods being chosen such that by the upward displacement of the at least one vertically displaceable actuation element a desired folding characteristic of the wings is achieved.

2. An apparatus for carrying out an up- and inwardly directed folding of edge areas of a dough member, comprising: a base plate; wing members projecting outwardly from said base plate and connected thereto by rubber resilient, flexible areas; and a plurality of rubber resilient rods, an upper end of each of said rods being rigidly connected to a lower side of one of said wing members, said rods projecting substantially vertically downwardly to an upwardly displaceable actuation element, with which lower ends of said rods are rigidly connected.

* * * * *